US012783197B2

(12) United States Patent
Yuan et al.

(10) Patent No.: US 12,783,197 B2
(45) Date of Patent: Nov. 3, 2026

(54) METHOD, APPARATUS, ELECTRONIC DEVICE AND STORAGE MEDIUM FOR PROCESSING INFORMATION

(71) Applicant: Beijing Zitiao Network Technology Co., Ltd., Beijing (CN)

(72) Inventors: Qi Yuan, Beijing (CN); Yan Lu, Beijing (CN); Jiali Ye, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/241,674

(22) Filed: Jun. 18, 2025

(65) Prior Publication Data

US 2025/0315195 A1 Oct. 9, 2025

Related U.S. Application Data

(63) Continuation of application No. 18/898,291, filed on Sep. 26, 2024, now Pat. No. 12,360,717.

(30) Foreign Application Priority Data

Sep. 27, 2023 (CN) ......................... 202311270486.6

(51) Int. Cl.
*G06F 3/14* (2006.01)
*G06F 3/04845* (2022.01)

(52) U.S. Cl.
CPC ............ *G06F 3/14* (2013.01); *G06F 3/04845* (2013.01)

(58) Field of Classification Search
CPC ............................... G06F 3/04845; G06F 3/14
See application file for complete search history.

(56) References Cited

U.S. PATENT DOCUMENTS

2011/0269491 A1 11/2011 Eberhart et al.
2021/0243362 A1* 8/2021 Castillo ................ H04N 23/633

FOREIGN PATENT DOCUMENTS

CN 115794603 A 3/2023
CN 116415010 A 7/2023

OTHER PUBLICATIONS

China National Intellectual Property Administration, Office Action and Search Report Issued in Application No. 202311270486.6, Sep. 20, 2025, 16 pages.

(Continued)

*Primary Examiner* — Stacy Khoo
(74) *Attorney, Agent, or Firm* — Alleman Hall LLP

(57) ABSTRACT

Disclosed are a method, apparatus, electronic device, and storage medium for processing information. The method includes: in accordance with detecting an operation of triggering a target object, obtaining a resource attribute of the target object; in accordance with detecting the resource attribute meeting a predetermined condition, making response to a first triggering operation by a user for using the target object, and updating the resource attribute of the target object; and processing a target subject based on the target object, and presenting a processing result on a display interface. The frequency of initiating the request to the server by the user is restricted based on the resource attribute, so that the processing pressure of the server is relieved. Furthermore, the user is stimulated to publish the processed effect images based on resource attributes, so that other end users may use the effects of the target object, thereby interactivity is improved.

17 Claims, 4 Drawing Sheets

(56) References Cited

OTHER PUBLICATIONS

China National Intellectual Property Administration, Notice of Allowance Issued in Application No. 202311270486.6, Mar. 16, 2026, 6 pages.

Zhao, Y.,"Research on Scenario Propagation Strategy of In-feed Ads in TikTok Short Video Live Broadcast Platform: Based on SIPS Model," Master of Journalism and Communication Thesis, Yantai University, Jun. 5, 2022, 110 pages. (Submitted with English Abstract).

* cited by examiner

METHOD, APPARATUS, ELECTRONIC DEVICE AND STORAGE MEDIUM FOR PROCESSING INFORMATION

CROSS-REFERENCE

The present application is a continuation of U.S. patent application Ser. No. 18/898,291, filed on Sep. 26, 2024 and entitled "METHOD, APPARATUS, ELECTRONIC DEVICE AND STORAGE MEDIUM FOR PROCESSING INFORMATION," which claims priority to Chinese Patent Application No. 202311270486.6, filed on Sep. 27, 2023 and entitled "METHOD, APPARATUS, ELECTRONIC DEVICE AND STORAGE MEDIUM FOR PROCESSING INFORMATION", the entire contents of which are incorporated herein by reference.

FIELD

The embodiment of the disclosure relates to the technical field of computers, in particular to a method, an apparatus, and a storage medium for processing information.

BACKGROUND

With the development of mobile Internet, advances in network technology, and popularization of intelligent terminals, terminal devices are used to shoot corresponding effect short videos or effect images.

When generating the effect short video or effect image, there may be a problem of repeated trial before the effect is opened, that is, the operation of uploading the image or taking the image is triggered multiple times, and the effect processing is performed to generate the corresponding effect image.

In this case, the server may receive the processing request for multiple times, and a new processing request may be triggered again when the corresponding effect image has not been generated, resulting in a problem of resource waste of the server. Further, trial may be performed repeatedly before shooting, there may be a situation in which user only tries by not to submit, thereby causing poor interactivity.

SUMMARY

According to a method, an apparatus, an electronic device and a storage medium for processing information provided by the embodiment of this disclosure, the resource attribute corresponding to the target object can be dynamically updated, and then whether an effect is performed is determined in combination with the resource attribute, so that the processing pressure of server is relieved.

According to a first aspect, an embodiment of the present disclosure provides a method for processing information, comprising:

- in accordance with detecting an operation of triggering a target object, obtaining a resource attribute of the target object;
- in accordance with detecting the resource attribute meeting a predetermined condition, making response to a first triggering operation by a user for using the target object, and updating the resource attribute of the target object; and
- processing a target subject based on the target object, and presenting a processing result on a display interface.

According to a second aspect, an embodiment of the present disclosure provides an apparatus for processing information, comprising:

- a resource attribute obtaining module configured to, in accordance with detecting an operation of triggering a target object, obtain a resource attribute of the target object;
- a resource attribute updating module configured to, in accordance with detecting the resource attribute meeting a predetermined condition, make response to a first triggering operation by a user for using the target object, and update the resource attribute of the target object; and
- a result displaying module configured to process a target subject based on the target object, and present a processing result on a display interface.

According to a third aspect, an embodiment of the present disclosure provides an electronic device, comprising:

- one or more processors; and
- a storage device for storing one or more programs;
- the one or more programs, when executed by the one or more processors, causing the one or more processors to implement the method for processing information according to the embodiment of this disclosure.

According to a fourth aspect, an embodiment of the present disclosure provides a storage medium comprising computer-executable instructions, wherein the computer-executable instructions, when executed by a computer processor, perform the method for processing information according to the embodiment of this disclosure.

According to the technical scheme provided by the embodiment of the disclosure, in accordance with detecting an operation of triggering a target object, a resource attribute of the target object may be firstly obtained. Then, when it is detected that the resource attribute meets a predetermined condition, a first triggering operation by a user for using the target object may be responded to, thus processing a target subject based on the target object, and presenting a processing result on a display interface, and updating the resource attribute of the target object. In such a way, the solution of this disclosure solves the problems in the prior art that the processing pressure of the server is larger due to the repeated trial of the effect object when shooting the effect video or the effect image, and the interactive effect is poor due to the trial by the user only without submitting. The solution also realizes the restriction of the frequency of the user initiating the request to the server based on the resource attribute, thereby relieving the processing pressure of the server. Further, the user is stimulated to publish the processed effect images based on resource attributes, so that other end users may use the effects of the target object, thereby interactivity is improved.

BRIEF DESCRIPTION OF DRAWINGS

The above and other features, advantages, and aspects of various embodiments of the present disclosure will become more apparent from the following detailed description taken in conjunction with the accompanying drawings. Throughout the drawings, the same or similar reference numbers refer to the same or similar elements. It should be understood that the drawings are schematic, and elements and components are not necessarily drawn to scale.

DETAILED DESCRIPTION

Figure 1:
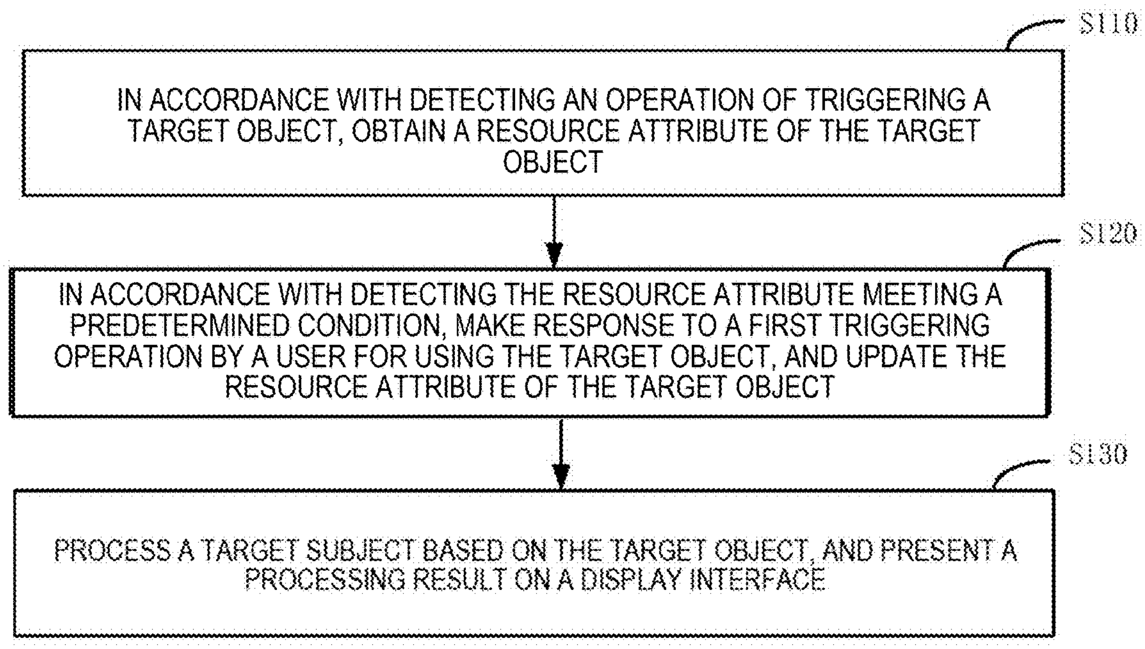
FIG. 1 is a schematic flowchart of a method for processing information according to an embodiment of the present disclosure.

Embodiments of the present disclosure will be described in more detail below with reference to the accompanying drawings. While certain embodiments of the present disclosure are shown in the drawings, it is to be understood that the present disclosure may be implemented in various forms, and should not be construed as limited to the embodiments set forth herein. Rather, these embodiments are provided for a more thorough and complete understanding of the present disclosure. It should be understood that the drawings and embodiments of the present disclosure are for exemplary purposes only and are not intended to limit the scope of the present disclosure.

It should be understood that the steps recited in the method embodiments of the present disclosure may be performed in different orders, and/or in parallel. Further, the method embodiments may include additional steps and/or omit performing the illustrated steps. The scope of the present disclosure is not limited in this respect.

As used herein, the term "comprises" and variation thereof are open-ended, i.e., "comprises but not limited to". The term "based on" means "based at least in part on". The term "one embodiment" means "at least one embodiment"; the term "another embodiment" means "at least one further embodiment"; and the term "some embodiments" means "at least some embodiments". The relevant definition of other terms will be given below.

It should be noted that terms such as "first" and "second" mentioned in this disclosure are merely used to distinguish different apparatuses, modules, or units, and are not intended to limit the order of functions performed by the apparatuses, modules, or units or the mutual dependency relationship.

It should be noted that the modification of "a" and "a plurality" mentioned in this disclosure is illustrative and not limiting, and those skilled in the art should understand that they mean "one or more" unless the context clearly indicates otherwise.

The names of messages or information interacted between a plurality of devices in embodiments of the present disclosure are for illustrative purposes only, and are not intended to limit the scope of such messages or information.

It can be understood that, before the technical solutions disclosed in the embodiments of the present disclosure are used, the types, the usage scope, the usage scenario and the like of personal information involved in the present disclosure should be notified to the user in an appropriate manner according to the relevant laws and regulations and the authorization of the user must be acquired.

For example, in response to receiving an active request from a user, prompt information is sent to the user to explicitly prompt the user that the requested operation will need to acquire and use the personal information of the user. Therefore, the user may autonomously select whether to provide personal information to software or hardware executing the operation of the technical solution of the present disclosure according to the prompt information, such as an electronic device, application program or storage medium.

As an optional but non-limiting implementation, in response to receiving the active request of the user, the manner of sending the prompt information to the user may be, for example, a pop-up window, and the prompt information may be presented in text in the pop-up window. In addition, the pop-up window may further carry a selection control for the user to select "agree" or "disagree" to provide personal information to the electronic device.

It may be understood that the foregoing notification and obtaining a user authorization process is merely illustrative, and does not constitute a limitation on implementations of the present disclosure, and other manners of meeting related laws and regulations may also be applied to implementations of the present disclosure.

It may be understood that the data involved in the technical solution (including but not limited to the data itself, the acquisition or use of the data) should follow the requirements of the corresponding laws and regulations and related regulations.

Before describing the embodiments of the present disclosure, the application scenario may be described first. For short video shooting, effect video shooting and effect image generation scenarios, a user may trigger a corresponding effect item to generate effect videos or effect images with the effect prop, or try only the corresponding effects items each time to preview the effects images with different effects. In other words, before the effect video or the effect image is captured, the user may repeatedly trigger the corresponding effect item, which causes a lot of pressure on the server to process requests, thus may easily generate redundant requests. For example, before an effect image corresponding to a effect item is generated, a new effect request is received, the server will process the received repeated effect request, resulting in waste of server resources. Further, before starting shooting, it is possible to repeatedly try it out, which makes it difficult to submit recorded videos.

It should also be noted that, for a specific effect item, optionally, an AI effect, for different user attributes, the style of the generated effect image is different. Optionally, the user attribute may comprise information such as gender, age and the like, wherein the information such as gender and age may be automatically recognized based on existing analysis software, and the accuracy of recognition is not within the protection scope of this embodiment. Based on the recognition result, different styles of effect images may be generated. In such a way, the user may repeatedly upload or capture images to generate different style effect images. Therefore, by adopting the scheme provided by the embodiment of the disclosure, the processing pressure of the server can be reduced, and the submission rate of the user can be improved.

FIG. 1 is a schematic flowchart of a method for processing information according to an embodiment of the present disclosure. The embodiment of the present disclosure is applicable to a situation in which a resource attribute needs to be updated. The method may be executed by an apparatus for processing information, which may be implemented in the form of software and/or hardware, optionally, by an electronic device. The electronic device may be a mobile terminal such as mobile phone, smart swatch, tablet computer and personal digital assistant, or a personal computer (PC) or server, or the like.

As shown in FIG. 1, the method comprises:

S110: in accordance with detecting an operation of triggering a target object, obtain a resource attribute of the target object.

The target object may be any effect object that may be triggered. Optionally, the effect object may be any effect item that may be used in the short video shooting scene. The effect item may be a resource usage package, which may correspond to a text or a sticker, or may be a resource for performing effect processing in a whole, or an image generation model for generating corresponding effect of effect image. The image generation model may generate effect images with different styles. The resource attribute may be the current available frequency of the target object. The operation on the target object may be an operation of clicking the target object based on the key, or may be an operation of clicking the target object based on the mouse, or may be a touch operation on the target object under the touch screen condition.

Specifically, after the user triggers the application, the main interface of the application may be displayed on the display interface. In a certain region of the main interface, a plurality of effect items may be displayed. The displayed plurality of effect items may be used as object to be triggered. The user may click any one of the plurality of to-be-triggered object and take it as the target object. The server may fetch the resource attribute corresponding to the target object.

It may be understood that, after the click on the target object is detected, the resource attribute corresponding to the target object, that is, the current available number of the target object, may be fetched.

In this embodiment, before the resource attribute of the target object is obtained, the resource attribute matching the target object may be determined first. Optionally, in response to the target object being triggered for the first time, the resource attribute for the target object is configured; in response to the target object being not triggered for the first time, the resource attribute corresponding to the target object is fetched, wherein the resource attribute is determined based on a historical operation associated with the target object.

Generally, for an application, there are a plurality of to-be-triggered object, and not every to-be-triggered object will be triggered. Therefore, after the target object is detected, a resource attribute may be determined according to a trigger attribute corresponding to the target object.

The trigger attribute comprises a first trigger attribute or a non-first trigger attribute.

Specifically, if the attribute is a first trigger attribute, it indicates that the target object is not used, and a corresponding resource attribute may be configured for the target object. It should be noted that the first configured resource attribute is mainly as a predetermined attribute. If the target object is not triggered for the first time, it indicates that the target object has been used, that is, the server stores the resource attribute corresponding to the target object. At this time, the resource attribute corresponding to the target object may be fetched, and the resource attribute is the updated resource attribute after the target object is used.

For example, the resource attribute corresponds to a usable frequency of the target object. If the target object is triggered for the first time, the resource attribute configured for the target object is the predetermined resource attribute. Optionally, the usable frequency corresponding to the predetermined resource attribute is 3, and the specific usable frequency may be set according to actual needs. If not used for the first time, the resource attribute corresponding to the target object stored in the server is obtained. At this time, the resource attribute corresponding to the target object stored in the server is determined based on the historical operation performed by the user on the target object. The associated historical operation may comprise an operation of performing effect processing based on the target object, or an operation of publishing the effect processed content.

Figure 2:
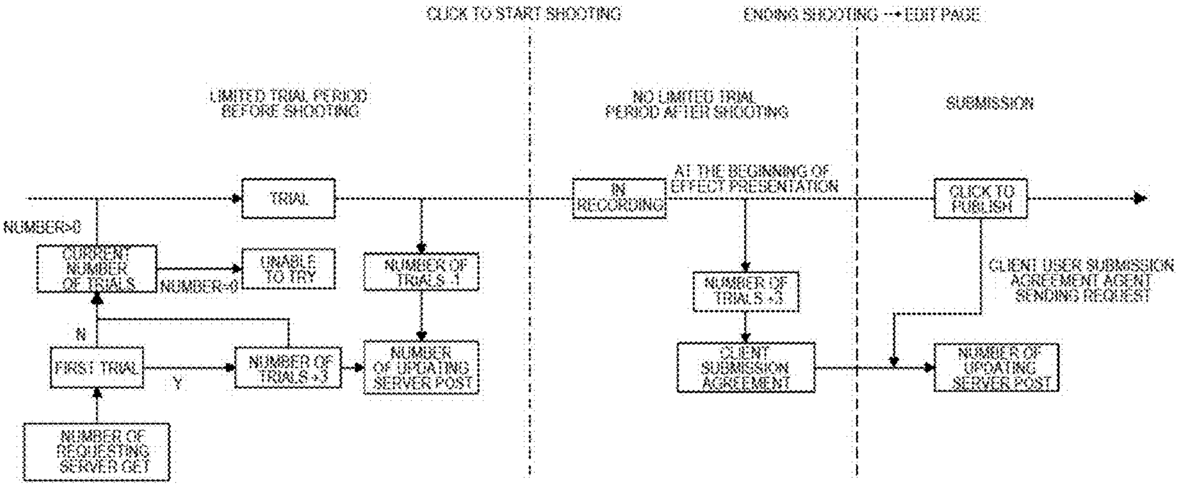
FIG. 2 is a schematic flowchart of a method for processing information according to an embodiment of the present disclosure.

For example, referring to FIG. 2, before the shooting is started, when the operation of triggering the target object is detected, the resource attribute corresponding to the target object stored in the server may be requested. At the same time, it may be determined whether the target object is used for the first time. If yes, the resource attribute may be configured for the target object. Optionally, the resource attribute may be a usable frequency, it may be that the value 3 may be given to the usable frequency of the target object. If not used for the first time, the stored resource attribute may be obtained, where the resource attribute is determined based on the historical operation of the user.

S120: in accordance with detecting the resource attribute meeting a predetermined condition, make response to a first triggering operation by a user for using the target object, and update the resource attribute of the target object.

The predetermined condition is set in advance for determining whether to respond to the first trigger operation. The first trigger operation may be understood as a trigger operation on the target object by using the target object.

It may be understood that, when it is detected that the resource attribute meets the predetermined condition, the first triggering operation by a user for using the target object may be responded to, and perform the event corresponding to the trigger operation. When the event corresponding to the first trigger operation is executed, the server may update the resource attribute of the target object. The advantage of this arrangement is to solve the problem that the server responds to the request indefinitely. Further, since the resource attribute is updated, the user corresponding to the client may be reminder effectively.

For example, with continued reference to FIG. 2, if the resource attribute (the current trial number) meets the predetermined condition (greater than 0 times), the first trigger operation by the user for using the target object may be responded to.

In this embodiment, the first trigger operation comprises an operation of uploading a to-be-processed image comprising a target subject, or the first trigger operation comprises an operation of capturing a to-be-processed image comprising the target subject, and updating the resource attribute of the target object comprises: updating the resource attribute of the target object according to a predetermined adjustment attribute.

The predetermined adjustment attribute may be an attribute of an update step size based on the obtained resource attribute. For example, the predetermined adjustment attribute is 1, that is, the update step size is 1. When it is detected that the first trigger operation is performed, the original resource attributes may be downward adjusted according to the predetermined adjustment attribute to obtain updated resource attributes, and the updated resource attributes may be stored on the server.

For example, with continued reference to FIG. 2, in response to the first trigger operation by the user for the target object, the resource attribute of the target object may be updated according to the predetermined adjustment attribute, which may be subtracting a predetermined number of times from the resource attribute, in this case, the predetermined adjustment attribute may be predetermined number of times.

S130: process a target subject based on the target object, and present a processing result on a display interface.

It should be noted that, when the resource attribute meets the predetermined condition and the first trigger operation is detected, it indicates that the target subject may be processed based on the target object, and in this case, the target subject may be processed based on the target object, and the processing result is presented on the real interface.

The target object may be a to-be-processed image, or may be an object in the to-be-processed image that needs to be processed. Optionally, the object may be a user, an animal or a plant, or a predetermined object. The display interface may be understood as an interface presented by the terminal device, that is, a present interface for presenting a processing result.

On the basis of the foregoing technical solution, in response to the resource attribute not meeting the predetermined condition, or the updated resource attribute not meeting the predetermined condition, the method further comprises: presenting the resource attribute and guidance information corresponding to the resource attribute in a target area of the display interface, to enable the user, after performing an operation corresponding to the guidance information, to update the resource attribute so that the resource attribute meets the predetermined condition.

The guidance information may be information that guides the user to perform a corresponding operation to update the resource attribute. Optionally, the guidance information may be a text description illustrating that the current trial number reaches an upper limit and the trial may continue only if publish or submission is performed. The target region may be any region in the display interface, as long as it can present corresponding guide information.

It may be understood that, if the resource attribute does not meet the predetermined condition or the updated resource attribute does not meet the predetermined condition, the resource attribute and the corresponding guidance information may be displayed on the display interface. On one hand, the user may be reminded that the current resource attribute has been used, and on the other hand, the user may be reminded to perform a corresponding operation to obtain more resource attributes.

In this embodiment, in response to the resource attribute reaching a predetermined attribute threshold, a second interface on the display interface is presented to update the resource attribute based on a trigger operation on a target control on the second display interface; wherein the second interface comprises the target control, and the target control is a value control for obtaining the resource attribute.

The predetermined attribute threshold may be a predetermined minimum lower limit. Optionally, the predetermined attribute threshold may be 0. The second interface may be a new pop-up interface, or correspond to a pop-up interface. The target control may be a control for triggering value payment.

In practical applications, there may be a problem where even if guidance information is displayed on the display interface, the user still does not execute it. At this time, there may be a case in which the resource attribute reaches the predetermined attribute threshold. When the user tries the target object again, the second interface may be displayed on the display interface, and the target control may be presented in the second interface. When the target control is triggered, the payment interface or the task interface may be jumped to, thus to obtain the resource attribute corresponding to the target object.

According to the technical scheme provided by the embodiment of the disclosure, in accordance with detecting an operation of triggering a target object, a resource attribute of the target object may be firstly obtained. Then, when it is detected that the resource attribute meets a predetermined condition, a first triggering operation by a user for using the target object may be responded to, thus processing a target subject based on the target object, and presenting a processing result on a display interface, and updating the resource attribute of the target object. In such a way, the solution of this disclosure solves the problems in the prior art that the processing pressure of the server is larger due to the repeated trial of the effect object when shooting the effect video or the effect image, and the interactive effect is poor due to the trial by the user only without submitting. The solution also realizes the restriction of the frequency of the user initiating the request to the server based on the resource attribute, thereby relieving the processing pressure of the server. Further, the user is stimulated to publish the processed effect images based on resource attributes, so that other end users may use the effects of the target object, thereby interactivity is improved.

Figure 3:
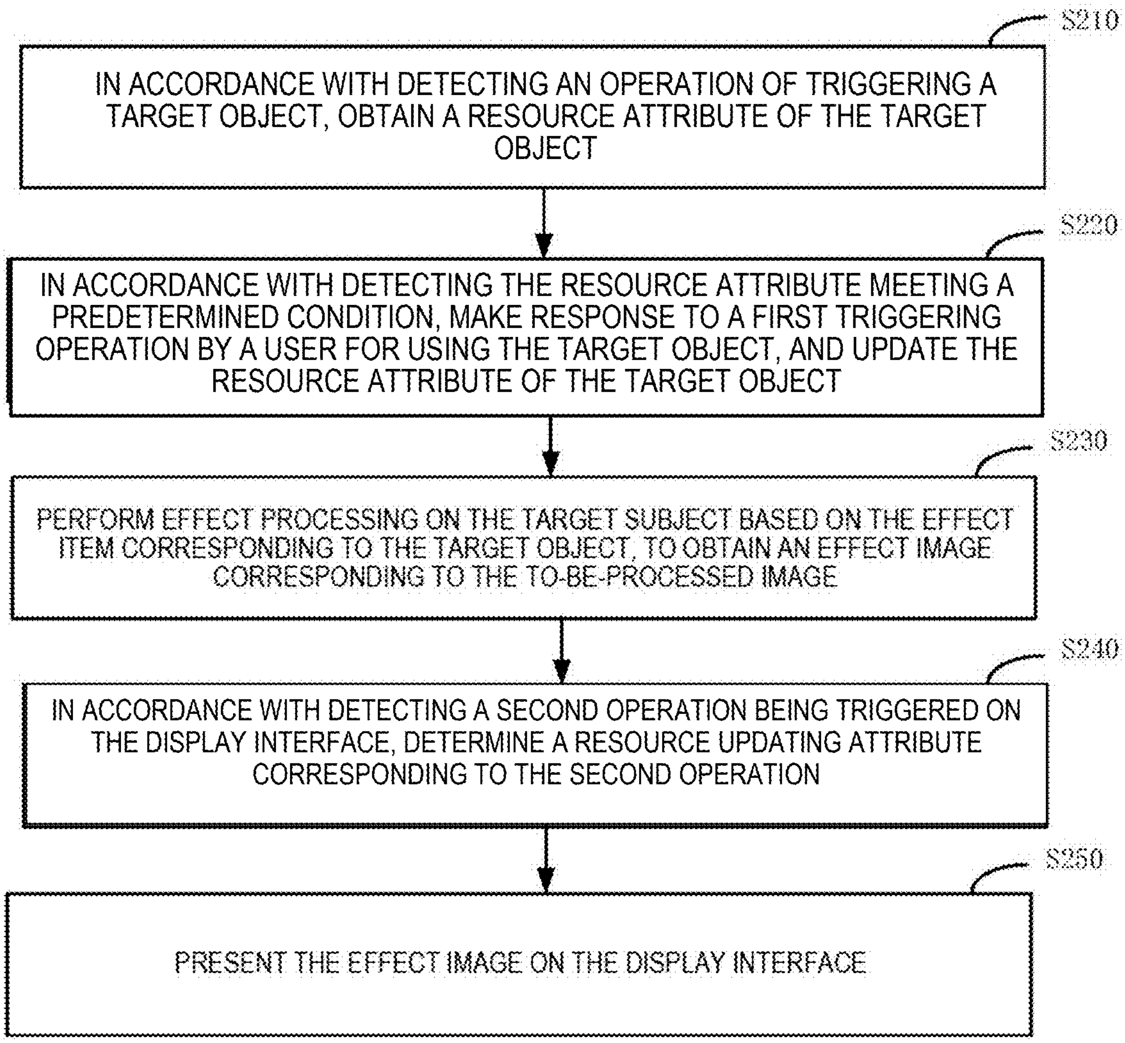
FIG. 3 is a schematic flowchart of a method for processing information according to an embodiment of the present disclosure.

FIG. 3 is a schematic flowchart of a method for processing information according to an embodiment of the present disclosure. On the basis of the aforementioned embodiments, the target object may comprise at least one effect item. Correspondingly, the target subject is processed based on the target object and presented on the display interface. The specific implementation can be described in detail in this embodiment, wherein the same or corresponding technical terms as the aforementioned embodiments are not repeated here.

As shown in FIG. 3, the method comprises:

S210: in accordance with detecting an operation of triggering a target object, obtain a resource attribute of the target object.

S220: in accordance with detecting the resource attribute meeting a predetermined condition, make response to a first triggering operation by a user for using the target object, and update the resource attribute of the target object.

S230: perform effect processing on the target subject based on the effect item corresponding to the target object, to obtain an effect image corresponding to the to-be-processed image.

It may be understood that at least one to-be-triggered object may be displayed in a region of the display interface, and at this time, a thumbnail corresponding to the to-be-triggered object is displayed. The to-be-triggered object corresponds to an effect item. That is, when the effect item is triggered, the effect processing may be performed on the to-be-triggered object. Different to-be-triggered objects correspond to different effect items. The target subject may be a collected or uploaded to-be-processed image, or may be a predetermined type of object in the to-be-processed image. Optionally, the target subject may be a user, or may be a animal or plant or a landscape picture. The to-be-processed image may be an uploaded image, or may be an image captured by the camera device after the target object is triggered. The target subject may be processed based on the effect resource package corresponding to the target object to obtain the effect image.

S240: present the effect image on the display interface.

Specifically, the effect image after the effect processing may be presented on the display interface.

According to the technical scheme provided by the embodiment of the disclosure, in accordance with detecting an operation of triggering a target object, a resource attribute of the target object may be firstly obtained. Then, when it is detected that the resource attribute meets a predetermined condition, a first triggering operation by a user for using the target object may be responded to, thus processing a target subject based on the target object, and presenting a processing result on a display interface, and updating the resource attribute of the target object. In such a way, the solution of this disclosure solves the problems in the prior art that the processing pressure of the server is larger due to the repeated trial of the effect object when shooting the effect video or the effect image, and the interactive effect is poor due to the trial by the user only without submitting. The solution also realizes the restriction of the frequency of the user initiating the request to the server based on the resource attribute, thereby relieving the processing pressure of the server. Further, the user is stimulated to publish the processed effect images based on resource attributes, so that other end users may use the effects of the target object, thereby interactivity is improved.

Figure 4:
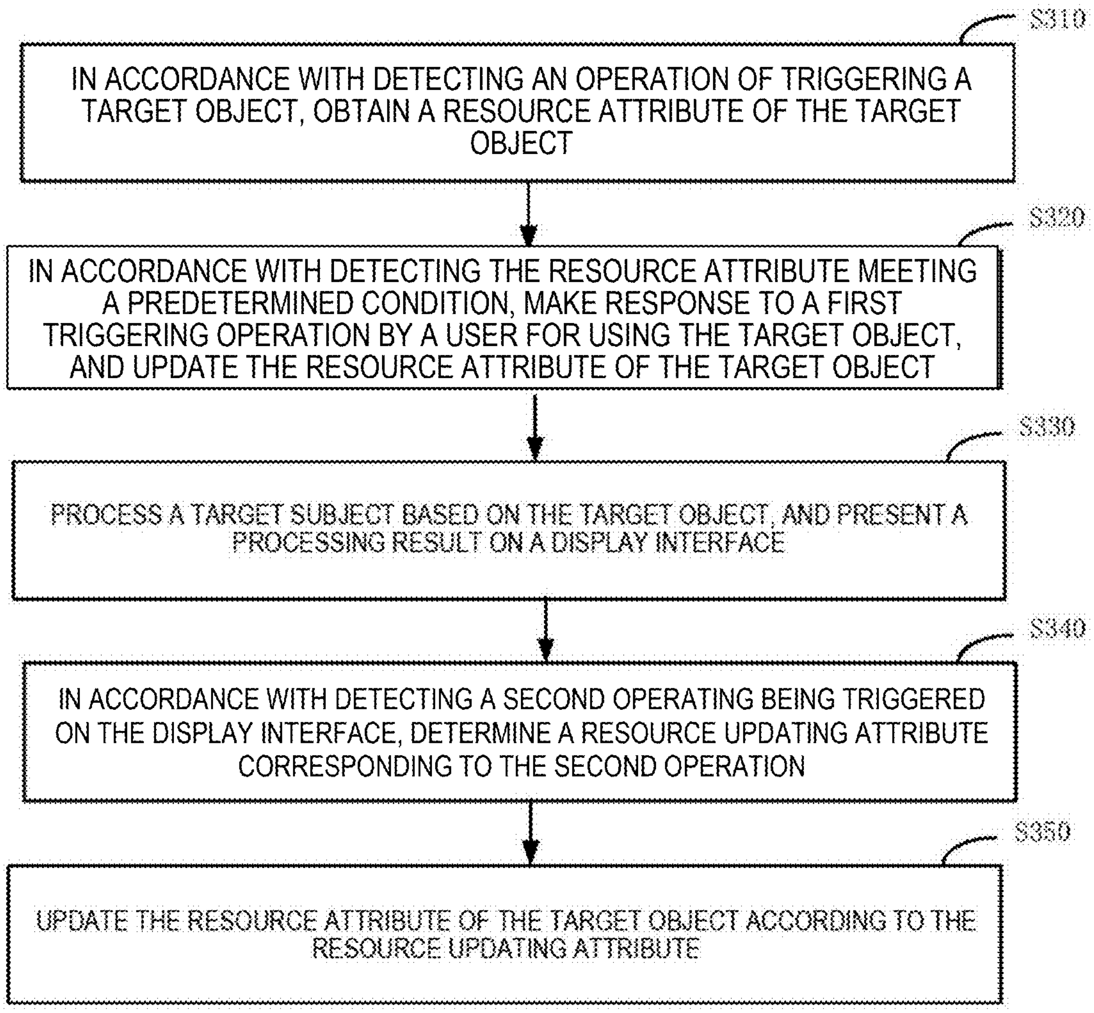
FIG. 4 is a schematic flowchart of a method for processing information according to an embodiment of the present disclosure.

FIG. 4 is a schematic flowchart of a method for processing information according to an embodiment of the present disclosure. On the basis of the aforementioned embodiments, after the processing result is presented on the display interface, the method further comprises: in accordance with detecting a second operation being triggered, a resource attribute of the target object may be updated based on the second operation. The specific implementation may be described in detail in this embodiment, wherein the same or corresponding technical terms as the aforementioned embodiments are not repeated here.

As shown in FIG. 4, the method comprises:

S310: in accordance with detecting an operation of triggering a target object, obtain a resource attribute of the target object.

S320: in accordance with detecting the resource attribute meeting a predetermined condition, make response to a first triggering operation by a user for using the target object, and update the resource attribute of the target object.

S330: process a target subject based on the target object, and present a processing result on a display interface.

S340: in accordance with detecting a second operation being triggered on the display interface, determine a resource updating attribute corresponding to the second operation.

The second operation corresponds to an operation of publishing or submitting a processing result. Optionally, the publishing control is triggered, and the effect video or the effect image is uploaded to the server to be distributed to other terminal devices for presenting. The resource updating attribute mainly corresponds to the second operation. The first trigger operation corresponds to a predetermined resource attribute, and the second operation corresponds to a resource updating attribute. The resource updating attribute may include a predetermined updating attribute value. Optionally, the predetermined updating attribute value is an attribute value superimposed on the basis of the existing resource attribute.

For example, with continued reference to FIG. 2, the second operation comprises an operation of recording, publishing or submitting. In response to the second operation, at the start of the effect presentation, the resource updating attribute may be obtained. Optionally, the resource updating attribute is 3, and the resource updating attribute may be superimposed on the basis of the target object resource attribute. After submission or publishing, the server may update the resource attribute.

S350: update the resource attribute of the target object according to the resource updating attribute.

Specifically, after the resource updating attribute is determined, the resource updating attribute may be superimposed on the basis of the resource attribute of the target object, to obtain the updated resource attribute.

According to the technical scheme provided by the embodiment of the disclosure, in accordance with detecting an operation of triggering a target object, a resource attribute of the target object may be firstly obtained. Then, when it is detected that the resource attribute meets a predetermined condition, a first triggering operation by a user for using the target object may be responded to, thus processing a target subject based on the target object, and presenting a processing result on a display interface, and updating the resource attribute of the target object. In such a way, the solution of this disclosure solves the problems in the prior art that the processing pressure of the server is larger due to the repeated trial of the effect object when shooting the effect video or the effect image, and the interactive effect is poor due to the trial by the user only without submitting. The solution also realizes the restriction of the frequency of the user initiating the request to the server based on the resource attribute, thereby relieving the processing pressure of the server. Further, the user is stimulated to publish the processed effect images based on resource attributes, so that other end users may use the effects of the target object, thereby interactivity is improved.

Figure 5:
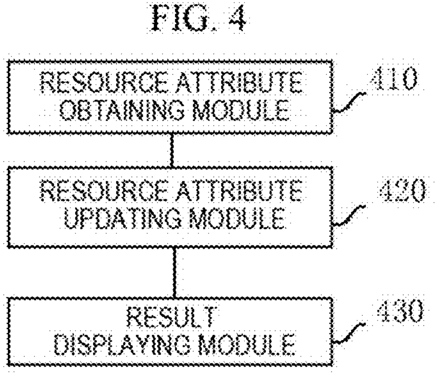
FIG. 5 is a schematic structural diagram of an apparatus for processing information according to an embodiment of the present disclosure.

FIG. 5 is a schematic structural diagram of an apparatus for processing information according to an embodiment of the present disclosure. The apparatus is integrated into the server. As shown in FIG. 5, the apparatus comprises a resource attribute obtaining module 410, a resource attribute updating module 420 and a result displaying module 430.

The resource attribute obtaining module 410 is configured to, in accordance with detecting an operation of triggering a target object, obtain a resource attribute of the target object. The resource attribute updating module 420 is configured to, in accordance with detecting the resource attribute meeting a predetermined condition, make response to a first triggering operation by a user for using the target object, and update the resource attribute of the target object. The result displaying module 430 is configured to process a target subject based on the target object, and present a processing result on a display interface.

On the basis of the foregoing technical solution, before obtaining the resource attribute of the target object, the resource attribute obtaining module comprises:

- a first resource attribute obtaining unit configured to: in response to the target object being triggered for the first time, configure the resource attribute for the target object; a second resource attribute obtaining unit configured to: in response to the target object being not triggered for the first time, fetch the resource attribute corresponding to the target object, wherein the resource attribute is determined based on a historical operation associated with the target object.

On the basis of the foregoing technical solution, the first trigger operation comprises an operation of uploading a to-be-processed image comprising a target subject, or the first trigger operation comprises an operation of capturing a to-be-processed image comprising the target subject, and the resource attribute updating module is configured to: update the resource attribute of the target object according to a predetermined adjustment attribute.

On the basis of the foregoing technical solution, the target object comprises at least one effect item, and the result displaying module comprises:

an effect image processing unit configured to: perform effect processing on the target subject based on the effect item corresponding to the target object, to obtain an effect image corresponding to the to-be-processed image; and a displaying unit configured to: present the effect image on the display interface.

On the basis of the foregoing technical solution, the apparatus further comprises:

a resource updating attribute determination module configured to: in accordance with detecting a second operation being triggered on the display interface, determine a resource updating attribute corresponding to the second operation; and a source attribute updating module configured to: update the resource attribute of the target object according to the resource updating attribute.

On the basis of the foregoing technical solution, in response to the resource attribute not meeting the predetermined condition, or the updated resource attribute not meeting the predetermined condition, the apparatus comprises: a presenting module configured to: present the resource attribute and guidance information corresponding to the resource attribute in a target area of the display interface, to enable the user, after performing an operation corresponding to the guidance information, to update the resource attribute so that the resource attribute meets the predetermined condition.

On the basis of the foregoing technical solution, the apparatus further comprises: a updating module configured to: in response to the resource attribute reaching a predetermined attribute threshold, present a second interface on the display interface to update the resource attribute based on a trigger operation on a target control on the second display interface; wherein the second interface comprises the target control, and the target control is a value control for obtaining the resource attribute.

According to the technical scheme provided by the embodiment of the disclosure, in accordance with detecting an operation of triggering a target object, a resource attribute of the target object may be firstly obtained. Then, when it is detected that the resource attribute meets a predetermined condition, a first triggering operation by a user for using the target object may be responded to, thus processing a target subject based on the target object, and presenting a processing result on a display interface, and updating the resource attribute of the target object. In such a way, the solution of this disclosure solves the problems in the prior art that the processing pressure of the server is larger due to the repeated trial of the effect object when shooting the effect video or the effect image, and the interactive effect is poor due to the trial by the user only without submitting. The solution also realizes the restriction of the frequency of the user initiating the request to the server based on the resource attribute, thereby relieving the processing pressure of the server. Further, the user is stimulated to publish the processed effect images based on resource attributes, so that other end users may use the effects of the target object, thereby interactivity is improved.

The apparatus for processing information provided in the embodiments of the present disclosure may perform the method for processing information provided in any embodiment of the present disclosure, and has corresponding functional modules and beneficial effects of performing the method.

It should be noted that the units and modules comprised in the foregoing apparatus are only divided according to the function logic, but are not limited to the foregoing division, as long as the corresponding functions can be implemented. In addition, the specific names of the functional units are merely for ease of distinguishing, and are not intended to limit the protection scope of the embodiments of the present disclosure.

Figure 6:
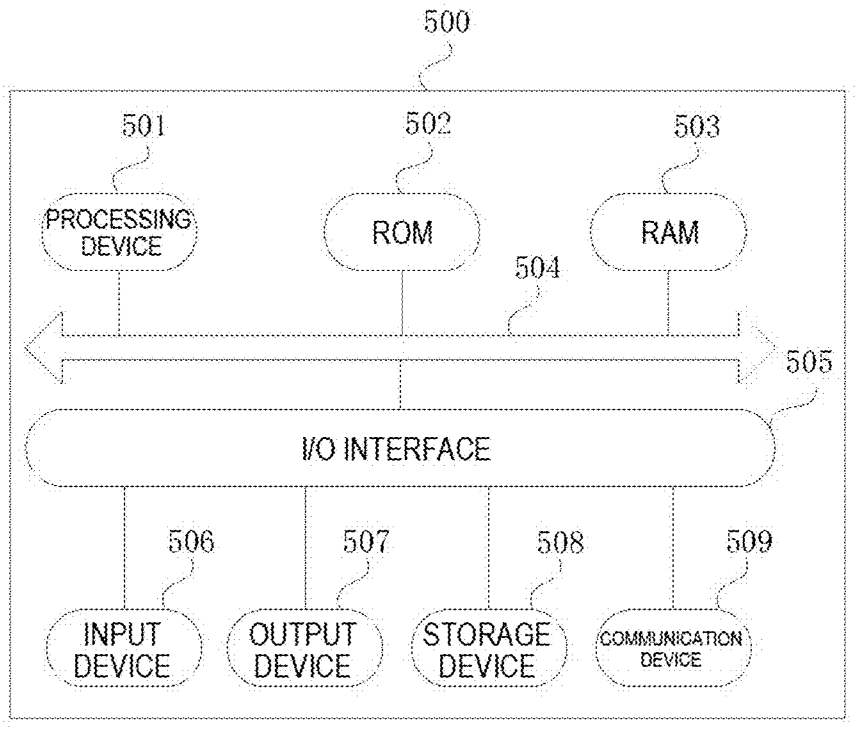
FIG. 6 is a schematic structural diagram of an electronic device according to an embodiment of the present disclosure.

FIG. 6 is a schematic structural diagram of an electronic device according to an embodiment of this disclosure. Reference now is made with FIG. 6, which is a schematic structural diagram of an electronic device (such as the terminal device or server in FIG. 6) 500 suitable for implementing the embodiments of the disclosure. The terminal device in the embodiments of the disclosure may comprise, but not limited to, a mobile terminal such as a mobile phone, a notebook computer, a digital broadcast receiver, a PDA (personal digital assistant), a PAD (portable Android device), a PMP (portable media player), an in-vehicle terminal (for example, an in-vehicle navigation terminal), and a fixed terminal such as a digital TV, a desktop computer, or the like. The electronic device shown in FIG. 6 is merely an example, and should not impose any limitation on the functionality and scope of use of the embodiments of the disclosure.

As shown in FIG. 6, the electronic device 500 may include a processing device (for example, a central processing unit, a graphics processor, etc.) 501, and the processing device 501 may perform various appropriate actions and processing according to a program stored in a read-only memory (ROM) 502 or a program loaded into a random access memory (RAM) 503 from a storage device 508. In the RAM 503, various programs and data required by the operation of the electronic device 500 are also stored. The processing device 501, the ROM 502, and the RAM 503 are connected to each other through a bus 504. An input/output (I/O) interface 505 is also connected to the bus 504.

Generally, the following devices may be connected to the I/O interface 505: an input device 506 including, for example, a touch screen, a touch pad, a keyboard, a mouse, a camera, a microphone, an accelerometer, a gyroscope, and the like; an output device 507 including, for example, a liquid crystal display (LCD), a speaker, a vibrator, and the like; a storage device 508 including, for example, a magnetic tape, a hard disk, and the like; and a communication device 509. The communication device 509 may allow the electronic device 500 to communicate wirelessly or wired with other devices to exchange data. While FIG. 6 shows an electronic device 500 having various devices, it should be understood that it is not required to implement or have all illustrated devices. More or fewer devices may alternatively be implemented or provided.

In particular, according to an embodiment of this disclosure, the process described above with reference to the flowchart may be implemented as a computer software program. For example, embodiments of the disclosure comprise a computer program product comprising a computer program embodied on a non-transitory computer readable medium, the computer program comprising program code for performing a method shown in flowchart. In such embodiments, the computer program may be downloaded and installed from the network through the communication device 509, or installed from the storage device 508, or from the ROM 502. When the computer program is executed by the processing device 501, the foregoing functions defined in the method of the embodiments of the present disclosure are performed.

The names of messages or information interacted between a plurality of devices in embodiments of the present disclosure are for illustrative purposes only, and are not intended to limit the scope of such messages or information.

The electronic device provided by the embodiments of the disclosure and the data communication method provided in the foregoing embodiments belong to the same inventive concept, and technical details not described in detail in this embodiment may refer to the foregoing embodiments, and this embodiment has the same beneficial effects as the foregoing embodiments.

An embodiment of the present disclosure provides a computer storage medium, having a computer program stored thereon, where the computer program, when executed by a processor, implements the method for processing information provided in the foregoing embodiments.

It should be noted that the computer readable medium described above may be a computer readable signal medium, or a computer readable storage medium, or a combination of the both. The computer-readable storage medium may be, for example, but not limited to, an electrical, magnetic, optical, electromagnetic, infrared, or semiconductor system, apparatus, or device, or a combination thereof. Examples of the computer-readable storage medium may comprise, but not limited to: an electrical connection having one or more wires, a portable computer diskette, a hard disk, a random access memory (RAM), a read-only memory (ROM), an erasable programmable read-only memory (such as an electronic programmable read-only memory (EPROM) or flash memory), an optical fiber, a portable compact disc read-only memory (CD-ROM), an optical storage device, a magnetic storage device, or a suitable combination thereof. In the disclosure, a computer-readable storage medium may be a tangible medium containing or storing a program that may be used by or in connection with an instruction execution system, apparatus, or device. In the disclosure, a computer readable signal medium may comprise a data signal propagated in baseband or as part of a carrier, where the computer readable program code is carried. Such propagated data signals may take a variety of forms, comprising but not limited to electromagnetic signals, optical signals, or suitable combinations thereof. The computer readable signal medium may also be any computer readable medium other than a computer readable storage medium that may send, propagate, or transmit a program for use by or in connection with an instruction execution system, apparatus, or device. The program code embodied on the computer-readable medium may be transmitted by any suitable medium, comprising but not limited to wires, optical cables, RF (radio frequency), and the like, or suitable combinations thereof.

In some implementations, the client, server may communicate using any currently known or future developed network protocol, such as HTTP (Hypertext Transfer Protocol), and may be interconnected with any form or medium of digital data communication (e.g., a communication network). Examples of communication networks include Local Area Networks (LANs), Wide Area Networks (WANs), Internet networks (e.g., the Internet), and peer-to-peer networks (e.g., ad hoc peer-to-peer networks), as well as currently known or future developed networks.

The computer-readable medium described above may be comprised in the electronic device; or may be separately present without being assembled into the electronic device.

The computer readable medium carries one or more programs, and when one or more programs is executed by the electronic device, the electronic device is caused to: in accordance with detecting an operation of triggering a target object, obtaining a resource attribute of the target object; in accordance with detecting the resource attribute meeting a predetermined condition, making response to a first triggering operation by a user for using the target object, and updating the resource attribute of the target object; and processing a target subject based on the target object, and presenting a processing result on a display interface.

Computer program code for performing the operations of the present disclosure may be written in one or more programming languages, including, but not limited to, object-oriented programming languages such as Java, Smalltalk, C++, and conventional procedural programming languages, such as the "C" language or similar programming languages. The program code may execute entirely on a user computer, partially on a user computer, as a stand-alone software package, partially on a user computer and partially on a remote computer, or entirely on a remote computer or server. In the case of a remote computer involved, the remote computer may be connected to the user computer through any kind of network, including a local area network (LAN) or a wide area network (WAN), or may be connected to an external computer (e.g., connected through the Internet using an Internet service provider).

The flowcharts and block diagrams in the figures illustrate architecture, functionality, and operation of possible implementations of systems, methods, and computer program products according to various embodiments of the present disclosure. In this regard, each block in the flowchart or block diagram may represent a module, program segment, or portion of code that comprises one or more executable instructions for implementing the specified logical function. It should also be noted that in some alternative implementations, the functions noted in the blocks may also occur in a different order than that illustrated in the figures. For example, two consecutively represented blocks may actually be performed substantially in parallel, which may sometimes be performed in the reverse order, depending on the functionality involved. It is also noted that each block in the block diagrams and/or flowcharts, as well as combinations of blocks in the block diagrams and/or flowcharts, may be implemented with a dedicated hardware-based system that performs the specified functions or operations, or may be implemented in a combination of dedicated hardware and computer instructions.

The units involved in the embodiments of the present disclosure may be implemented in software, or may be implemented in hardware. The name of the module does not constitute a limitation on the unit itself in some cases. For example, the video playing module may be described as "a module that plays target video in a predetermined page".

The functions described above may be performed, at least in part, by one or more hardware logic components. For example, without limitation, exemplary types of hardware logic components that may be used comprise: field programmable gate arrays (FPGAs), application specific integrated circuits (ASICs), application specific standard products (ASSPs), system-on-a-chip (SOCs), complex programmable logic devices (CPLDs), and the like.

In the context of the present disclosure, a machine-readable medium may be a tangible medium that may contain or store a program for use by or in connection with an instruction execution system, apparatus, or device. The server-readable medium may be a server-readable signal medium or a server-readable storage medium. The server-readable medium may comprise electronic, magnetic, optical, electromagnetic, infrared, or semiconductor systems, apparatus, or devices, or any suitable combination of the foregoing. The examples of server-readable storage media may include electrical connections based on one or more lines, portable computer disks, hard disks, random access memory (RAM), read-only memory (ROM), erasable programmable read-only memory (EPROM or Flash memory), optical fibers, portable compact disc read-only memory (CD-ROM), optical storage devices, magnetic storage devices, or any suitable combination of the foregoing.

According to one or more embodiments of the present disclosure, there is provided a method for processing information, comprising:

in accordance with detecting an operation of triggering a target object, obtaining a resource attribute of the target object;

in accordance with detecting the resource attribute meeting a predetermined condition, making response to a first triggering operation by a user for using the target object, and updating the resource attribute of the target object; and processing a target subject based on the target object, and presenting a processing result on a display interface.

According to one or more embodiments of the present disclosure, before obtaining the resource attribute of the target object, the method further comprises:

in response to the target object being triggered for the first time, configuring the resource attribute for the target object;

in response to the target object being not triggered for the first time, fetching the resource attribute corresponding to the target object, wherein the resource attribute being determined based on a historical operation associated with the target object.

According to one or more embodiments of the present disclosure, the first trigger operation comprises an operation of uploading a to-be-processed image comprising a target subject, or the first trigger operation comprises an operation of capturing a to-be-processed image comprising the target subject, and updating the resource attribute of the target object comprises: updating the resource attribute of the target object according to a predetermined adjustment attribute.

According to one or more embodiments of the present disclosure, the target object comprises at least one effect item, and processing the target subject based on the target object, and presenting the processing result on the display interface comprises:

performing effect processing on the target subject based on the effect item corresponding to the target object, to obtain an effect image corresponding to the to-be-processed image; and presenting the effect image on the display interface.

According to one or more embodiments of the present disclosure, further comprising: in accordance with detecting a second operation being triggered on the display interface, determining a resource updating attribute corresponding to the second operation; and updating the resource attribute of the target object according to the resource updating attribute.

According to one or more embodiments of the present disclosure, in response to the resource attribute not meeting the predetermined condition, or the updated resource attribute not meeting the predetermined condition, the method further comprises:

presenting the resource attribute and guidance information corresponding to the resource attribute in a target area of the display interface, to enable the user, after performing an operation corresponding to the guidance information, to update the resource attribute so that the resource attribute meets the predetermined condition.

According to one or more embodiments of the present disclosure, further comprising:

in response to the resource attribute reaching a predetermined attribute threshold, presenting a second interface on the display interface to update the resource attribute based on a trigger operation on a target control on the second display interface;

wherein the second interface comprises the target control, and the target control is a value control for obtaining the resource attribute.

According to one or more embodiments of the present disclosure, there is provided an apparatus for processing information, comprising:

a resource attribute obtaining module configured to, in accordance with detecting an operation of triggering a target object, obtain a resource attribute of the target object;

a resource attribute updating module configured to, in accordance with detecting the resource attribute meeting a predetermined condition, make response to a first triggering operation by a user for using the target object, and update the resource attribute of the target object; and a result displaying module configured to process a target subject based on the target object, and present a processing result on a display interface.

According to one or more embodiments of the present disclosure, there is provided an electronic device, comprising:

one or more processors; and a storage device for storing one or more programs;

the one or more programs, when executed by the one or more processors, causing the one or more processors to implement the method for processing information according to embodiments of this disclosure.

According to one or more embodiments of the present disclosure, there is provided a storage medium comprising computer-executable instructions, wherein the computer-executable instructions, when executed by a computer processor, perform the method for processing information of embodiments of this disclosure.

The above description is merely an illustration of the preferred embodiments of the present disclosure and the principles of the applied technology. It should be understood by those skilled in the art that the disclosure in the present disclosure is not limited to the technical solutions of the specific combination of the above technical features, and should also cover other technical solutions formed by any combination of the above technical features or their equivalent features without departing from the above disclosed concept. For example, the technical solution formed by mutually replacing the above features and the technical features have similar functions disclosed (but not limited to) in the present disclosure.

Further, while operations are depicted in a particular order, this should not be understood to require that these operations be performed in the particular order shown or in sequential order. In certain circumstances, multitasking and parallel processing may be advantageous. Likewise, while several specific implementation details are comprised in the discussion above, these should not be construed as limiting the scope of the present disclosure. Certain features described in the context of separate embodiments may also be implemented in combination in a single embodiment. Conversely, the various features described in the context of a single embodiment may also be implemented in multiple embodiments either individually or in any suitable sub-combination.

Although the present subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. A method, comprising:

receiving, through a display interface, a triggering operation associated with using a target object;

determining whether a predetermined condition associated with the target object is satisfied, wherein the predetermined condition is whether a current available trial number for using the target object is greater than a predetermined threshold number;

in response to determining that the predetermined condition associated with the target object is satisfied, responding to the triggering operation to allow the target object to be used to process a target subject; and in response to determining that the predetermined condition is not satisfied, displaying, on the display interface, information associated with the predetermined condition and guidance for guiding the user to perform a predetermined operation in order to make the predetermined condition satisfied.

2. The method of claim 1, further comprising:

configuring the current available trial number in response to determining that the target object is triggered for a first time; and fetching the current available trial number in response to determining that the target object is not triggered for the first time, wherein the current available trial number is determined based on a historical operation associated with the target object.

3. The method of claim 1, wherein the triggering operation comprises an operation of uploading a to-be-processed image comprising the target subject, or an operation of capturing a to-be-processed image comprising the target subject, and the method further comprises updating the current available trial number according to a predetermined adjustment number after responding to the triggering operation to allow the target object to be used to process the target subject, or after determining that the predetermined operation has been performed.

4. The method of claim 1, wherein the target object comprises at least one effect item, and the method further comprises:

performing effect processing on the target subject based on the at least one effect item to obtain an effect image corresponding to a to-be-processed image; and displaying the effect image on the display interface.

5. The method of claim 1, further comprising:

determining a predetermined updating value in response to detecting a second operation on the display interface; and updating the current available trial number based on the predetermined updating value.

6. The method of claim 5, wherein the second operation is an operation corresponding to publishing or submitting a processing result of processing the target subject using the target object.

7. The method of claim 1, further comprising:

in response to the current available trial number reaching the predetermined threshold number, presenting a second interface on the display interface, and updating the current available trial number in response to a trigger operation on a target control displayed on the second interface, wherein the target control is a value control for obtaining the current available trial number.

8. A device, comprising:

one or more processors; and a storage device for storing one or more programs that, when executed by the one or more processors, cause the one or more processors to:

receive, through a display interface, a triggering operation associated with using a target object;

determine whether a predetermined condition associated with the target object is satisfied, wherein the predetermined condition is whether a current available trial number for using the target object is greater than a predetermined threshold number;

in response to determining that the predetermined condition associated with the target object is satisfied, respond to the triggering operation to allow the target object to be used to process a target subject; and in response to determining that the predetermined condition is not satisfied, display, on the display interface, information associated with the predetermined condition and guidance for guiding the user to perform a predetermined operation in order to make the predetermined condition satisfied.

9. The device of claim 8, wherein the one or more programs further cause the one or more processors to:

configure the current available trial number in response to determining that the target object is triggered for a first time; and fetch the current available trial number in response to determining that the target object is not triggered for the first time, wherein the current available trial number is determined based on a historical operation associated with the target object.

10. The device of claim 8, wherein the triggering operation comprises an operation of uploading a to-be-processed image comprising the target subject, or an operation of capturing a to-be-processed image comprising the target subject, and the one or more programs further cause the one or more processors to update the current available trial number according to a predetermined adjustment number after responding to the triggering operation to allow the target object to be used to process the target subject, or after determining that the predetermined operation has been performed.

11. The device of claim 8, wherein the target object comprises at least one effect item, and the one or more programs further cause the one or more processors to:

perform effect processing on the target subject based on the at least one effect item to obtain an effect image corresponding to a to-be-processed image; and display the effect image on the display interface.

12. The device of claim 8, wherein the one or more programs further cause the one or more processors to:

determine a predetermined updating value in response to detecting a second operation on the display interface; and update the current available trial number based on the predetermined updating value.

13. The device of claim 12, wherein the second operation is an operation corresponding to publishing or submitting a processing result of processing the target subject using the target object.

14. The device of claim 8, the one or more programs further cause the one or more processors to:

in response to the current available trial number reaching the predetermined threshold number, presenting a second interface on the display interface, and update the current available trial number in response to a trigger operation on a target control displayed on the second interface, wherein the target control is a value control for obtaining the current available trial number.

15. A non-transitory storage medium comprising computer-executable instructions that, when executed by a processor, cause the processor to perform a method comprising:

receiving, through a display interface, a triggering operation associated with using a target object;

determining whether a predetermined condition associated with the target object is satisfied, wherein the predetermined condition is whether a current available trial number for using the target object is greater than a predetermined threshold number;

in response to determining that the predetermined condition associated with the target object is satisfied, responding to the triggering operation to allow the target object to be used to process a target subject; and in response to determining that the predetermined condition is not satisfied, displaying, on the display interface, information associated with the predetermined condition and guidance for guiding the user to perform a predetermined operation in order to make the predetermined condition satisfied.

16. The non-transitory storage medium of claim 15, wherein the method further comprises:

configuring the current available trial number in response to determining that the target object is triggered for a first time; and fetching the current available trial number in response to determining that the target object is not triggered for the first time, wherein the current available trial number is determined based on a historical operation associated with the target object.

17. The non-transitory storage medium of claim 15, wherein the triggering operation comprises an operation of uploading a to-be-processed image comprising the target subject, or an operation of capturing a to-be-processed image comprising the target subject, and the method further comprises updating the current available trial number according to a predetermined adjustment number after responding to the triggering operation to allow the target object to be used to process the target subject, or after determining that the predetermined operation has been performed.

* * * * *